UNITED STATES PATENT OFFICE.

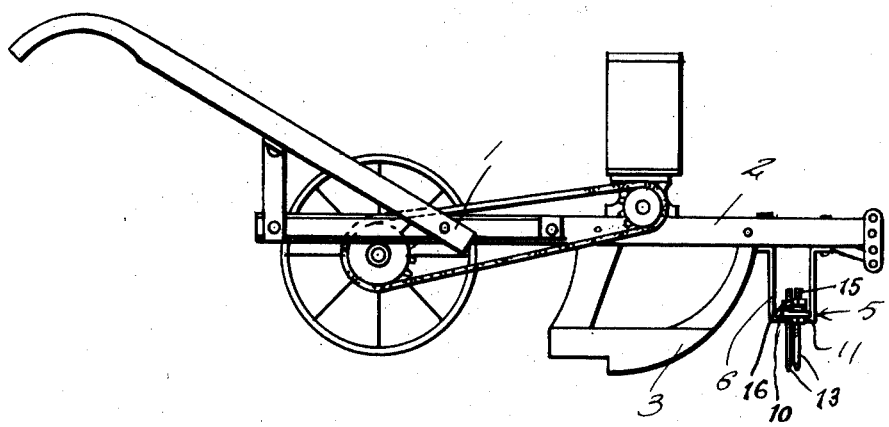
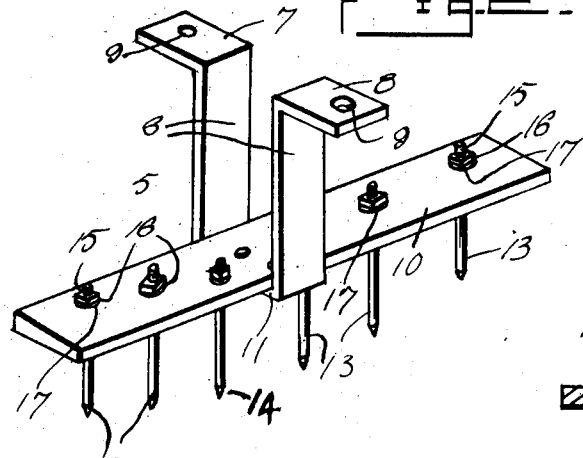
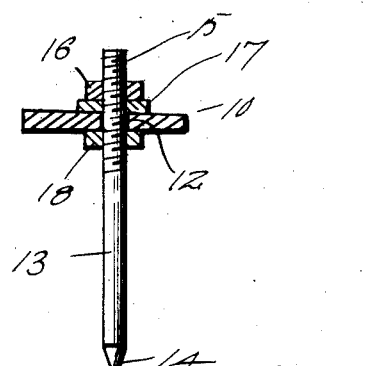

PLEAS W. GREEN, OF EGYPT, MISSISSIPPI.

HARROW.

1,401,332. Specification of Letters Patent. Patented Dec. 27, 1921.

Application filed January 14, 1920. Serial No. 351,418.

*To all whom it may concern:*

Be it known that I, PLEAS W. GREEN, a citizen of the United States, residing at Egypt, in the county of Chickasaw and State of Mississippi, have invented certain new and useful Improvements in Harrows; and I do hereby declare the following to be a full, clear, and exact description of the invention, such as will enable others skilled in the art to which it appertains to make and use the same.

This invention relates to harrows, and the primary object of the invention is to provide a harrow adapted for attachment to a corn or cotton planter forwardly of the furrow opening shoe, or a harrow which may be attached to a cultivator beam in lieu of a cultivator shovel-carrying standard, and shovel, if desired.

More specifically the object of this invention is to provide a harrow structure comprising a U-shaped attaching bar which has a straight horizontally positioned bar resting upon and attached to the upper surface of the bight portion of the attaching bar, which horizontal bar adjustably and removably carries a plurality of harrowing teeth, thereby providing a harrow structure which is extremely simple in construction, will be efficient in its operation, and when attached to a planter will eliminate the necessity of harrowing the ground by a separate operation, prior to the planting of the grain therein.

With the foregoing and other objects in view, this invention consists in such novel features of construction, combination and arrangement of parts as will be hereinafter more fully described, illustrated in the accompanying drawing and claimed.

In describing the invention in detail, reference will be had to the accompanying drawing, wherein like characters designate like and corresponding parts throughout the several views, and in which:

Figure 1 is a side elevation of a planter, showing the improved harrow attached thereto, Fig. 2 is a perspective view of the harrow, and Fig. 3 is a sectional view through the harrow, showing the manner of adjustably connecting the teeth to the horizontal supporting bar.

Referring more particularly to the drawing, 1 designates an ordinary one row corn or cotton planter, having the beam 2 and the furrow opening shoe 3. The improved harrow structure, generically indicated by the numeral 5, is attached to the under surface of the beam 1 forwardly of the furrow opening shoe 3, as clearly shown in Fig. 1 of the drawing. The improved harrow structure 5 comprises a substantially U-shaped attaching bar 6, which has the upper ends of its legs bent to form horizontally attaching flanges 8. The flanges 8 are provided with openings 9, which receive bolts to attach the U-shaped attaching member to the beam of a planter.

A horizontal bar 10 rests upon and is attached to the upper surface of the bight portion 11 of the U-shaped attaching member 6, and it is provided with a plurality of openings 12 through which the upper ends of harrow teeth 13 extend. The openings in the bar 10 are arranged in V-shaped formation, the apex of the openings being located at the front of the bar 10. The harrow teeth 13 have their lower ends pointed as shown at 14, as is ordinary in construction of harrow teeth. The upper ends of the harrow teeth are threaded, as shown at 15, and a nut 16 is mounted upon the threaded portion 15 above the bar 10 and engages a spacing washer 17. If it is desired, a second locking nut 18 may be mounted upon the harrow tooth beneath the bar 10, so that when the nuts 16 and 18 are adjusted, the harrow teeth 15 will be held against vertical movement independently of the bar 10. By the provision of the threaded end 15 and the nuts 16 and 18, the length of the harrow tooth, which projects beneath the bar 10, may be regulated as made necessary by conditions contingent with the use of the harrow.

In reducing the invention to practice, certain minor features of construction, combination and arrangement of parts may necessitate alterations to which the patentee is entitled, provided such alterations are comprehended within the scope of what is claimed.

What is claimed is:

1. In a harrow structure, a substantially U-shaped attaching bar member having horizontal attaching flanges formed upon the upper ends of its legs, a horizontal bar attached to the bight portion of said U-shaped attaching member, said bar provided with a plurality of openings, harrowing teeth extending through said openings, and means for adjustably connecting said harrowing teeth to said bar to regulate the length of projection of the teeth beneath the bar.

2. In a harrow structure, a substantially U-shaped attaching member having horizontally extending attaching flanges formed upon the upper ends of its legs, a horizontal bar attached to the bight portion of said U-shaped member and projecting substantially equal distances upon each side of the attaching member, said bar provided with a plurality of openings, harrowing teeth extending through said openings and having their upper ends threaded, nuts mounted upon said threaded ends for holding said harrowing teeth in adjusted positions with respect to said bar to regulate the projecting length of said teeth beneath said bar.

In testimony whereof I affix my signature in presence of two witnesses.

PLEAS W. GREEN.

Witnesses:
W. J. WILLIAMS,
H. B. LACEY.